US012252309B2

(12) United States Patent
Kucharczyk et al.

(10) Patent No.: US 12,252,309 B2
(45) Date of Patent: Mar. 18, 2025

(54) BINDER BOX

(71) Applicant: GRANDVILLE PRINTING CO., Grandville, MI (US)

(72) Inventors: Dennis M. Kucharczyk, Grandville, MI (US); Anthony S. Trevino, Grandville, MI (US)

(73) Assignee: GRANDVILLE PRINTING CO., Grandville, MI (US)

( * ) Notice: Subject to any disclaimer, the term of this patent is extended or adjusted under 35 U.S.C. 154(b) by 0 days.

(21) Appl. No.: 18/226,848

(22) Filed: Jul. 27, 2023

(65) Prior Publication Data

US 2023/0365296 A1 Nov. 16, 2023

Related U.S. Application Data

(63) Continuation of application No. 16/930,404, filed on Jul. 16, 2020, now abandoned.

(Continued)

(51) Int. Cl.

| | |
|---|---|
| ***B65D 5/52*** | (2006.01) |
| ***B65B 5/02*** | (2006.01) |
| ***B65B 5/06*** | (2006.01) |
| ***B65D 5/20*** | (2006.01) |
| ***G09F 3/02*** | (2006.01) |
| *B42F 3/04* | (2006.01) |
| *B42F 13/16* | (2006.01) |
| *G09F 3/10* | (2006.01) |

(52) U.S. Cl.

CPC ............ *B65D 5/5253* (2013.01); *B65B 5/024* (2013.01); *B65B 5/06* (2013.01); *B65D 5/2052* (2013.01); *G09F 3/02* (2013.01); *G09F 2003/0226* (2013.01); *G09F 3/10* (2013.01)

(58) Field of Classification Search

CPC . B42F 13/16; B42F 3/04; B65B 5/024; B65B 5/06; B65D 5/2052; B65D 5/247; B65D 5/5253; B65D 5/6632; G09F 2003/0226; G09F 3/02; G09F 3/10

USPC .......................................................... 206/757

See application file for complete search history.

(56) References Cited

U.S. PATENT DOCUMENTS

| | | | |
|---|---|---|---|
| 1,315,892 | A | 9/1919 | Wilson |
| 1,757,964 | A | 5/1930 | Hurst |

(Continued)

FOREIGN PATENT DOCUMENTS

| | | | | |
|---|---|---|---|---|
| DE | 1536691 | A1 * | 1/1970 | ............. B42F 13/26 |
| DE | 19643213 | | 4/1998 | |

(Continued)

OTHER PUBLICATIONS

Henry, "Vestcom Moves HQ Back to Little Rock," Arkansas Business, vol. 22, No. 11 (Mar. 21, 2005).

(Continued)

*Primary Examiner* — Anthony D Stashick
*Assistant Examiner* — Marcos Javier Rodriguez Molina
(74) *Attorney, Agent, or Firm* — PRICE HENEVELD LLP

(57) ABSTRACT

A binder box is used for shipping and distribution of shelf tags. The binder box has a number of apertures which permit the use of binders to secure sheets with shelf tags within the binder box. The binder box permits the sheets to be flipped as the shelf tags are removed. The sheets of tags can be organized such that the tags can be placed in spatial sequence within a store and/or organized by sections of the store.

20 Claims, 17 Drawing Sheets

Related U.S. Application Data

(60) Provisional application No. 62/874,690, filed on Jul. 16, 2019.

(56) References Cited

U.S. PATENT DOCUMENTS

| | | | | |
|---|---|---|---|---|
| 1,904,457 | A | 4/1933 | Healy | |
| 2,409,426 | A * | 10/1946 | Feldmann | B42F 13/16 281/29 |
| 2,720,044 | A | 10/1955 | Montalto | |
| 2,755,576 | A | 7/1956 | Golden | |
| 2,763,947 | A | 9/1956 | Philip et al. | |
| 2,882,625 | A | 4/1959 | Philip | |
| 2,984,031 | A | 5/1961 | Giesecke | |
| 3,159,937 | A | 12/1964 | Barnes | |
| 3,290,809 | A | 12/1966 | King | |
| 3,753,305 | A | 8/1973 | Mueh | |
| 3,977,109 | A | 8/1976 | Berry, Jr. et al. | |
| 4,016,977 | A | 4/1977 | Krautsack | |
| 4,070,778 | A | 1/1978 | Mahler et al. | |
| 4,152,851 | A | 5/1979 | Goldstein | |
| 4,167,073 | A | 9/1979 | Tang | |
| 4,179,138 | A | 12/1979 | Bogdanovic | |
| 4,338,739 | A | 7/1982 | Greenberger | |
| 4,391,375 | A | 7/1983 | Joyce | |
| 4,477,048 | A | 10/1984 | Conway | |
| 4,483,502 | A | 11/1984 | Fast | |
| 4,557,064 | A | 12/1985 | Thompson | |
| 4,564,548 | A | 1/1986 | Fast | |
| 4,572,380 | A | 2/1986 | Langwell | |
| 4,693,441 | A | 9/1987 | Conway | |
| 4,716,669 | A | 1/1988 | Fast | |
| 4,718,627 | A | 1/1988 | Fast et al. | |
| 4,798,014 | A | 1/1989 | Stoerzinger et al. | |
| 4,832,207 | A | 5/1989 | Alexander | |
| 4,919,377 | A | 4/1990 | Alexander et al. | |
| 5,172,314 | A | 12/1992 | Poland et al. | |
| 5,205,591 | A | 4/1993 | Lorenz | |
| 5,284,689 | A | 2/1994 | Laurash et al. | |
| 5,419,066 | A | 5/1995 | Harnois et al. | |
| 5,458,282 | A | 10/1995 | Martin | |
| 5,838,883 | A | 11/1998 | Pekelman | |
| 6,026,603 | A | 2/2000 | Kump et al. | |
| 6,186,555 | B1 | 2/2001 | Rawlings | |
| 6,189,778 | B1 * | 2/2001 | Kanter | B65D 5/001 229/172 |
| 6,266,906 | B1 | 7/2001 | Nagel | |
| 6,360,465 | B1 | 3/2002 | Simpson | |
| 6,408,553 | B1 | 6/2002 | Brown et al. | |
| 6,519,885 | B2 | 2/2003 | Valiulis | |
| 6,566,024 | B1 | 5/2003 | Bourdelais et al. | |
| 6,579,585 | B1 | 6/2003 | Garvic et al. | |
| 6,745,509 | B1 | 6/2004 | Lapp et al. | |
| 6,817,127 | B2 | 11/2004 | Gottlieb et al. | |
| 6,868,629 | B2 | 3/2005 | Fast et al. | |
| 6,981,343 | B2 | 1/2006 | Rawlings et al. | |
| 7,021,852 | B1 * | 4/2006 | Turner, III | B42F 13/16 24/67.11 |
| 7,440,903 | B2 | 10/2008 | Riley et al. | |
| 7,584,888 | B2 | 9/2009 | Stephenson et al. | |
| 8,011,126 | B2 | 9/2011 | Nunez et al. | |
| 8,020,765 | B2 | 9/2011 | Nunez et al. | |
| 8,261,477 | B1 | 9/2012 | Wilkinson et al. | |
| 8,613,156 | B2 | 12/2013 | Nunez et al. | |
| 8,928,923 | B2 | 1/2015 | Nunez | |
| 9,547,464 | B2 | 1/2017 | Nunez | |
| 2002/0198892 | A1 | 12/2002 | Rychel et al. | |
| 2003/0070332 | A1 | 4/2003 | Cruz et al. | |
| 2003/0222139 | A1 | 12/2003 | Stephenson et al. | |
| 2005/0022437 | A1 | 2/2005 | Gottlieb et al. | |
| 2005/0030557 | A1 | 2/2005 | Wiechers | |
| 2005/0043848 | A1 | 2/2005 | Wiechers | |
| 2005/0126060 | A1 | 6/2005 | Rawlings et al. | |
| 2006/0010743 | A1 | 1/2006 | Fowler et al. | |
| 2006/0033323 | A1 | 2/2006 | Reynolds | |
| 2006/0225593 | A1 | 10/2006 | Flynn et al. | |
| 2006/0236568 | A1 | 10/2006 | Switzer et al. | |
| 2007/0246532 | A1 | 10/2007 | Nunez et al. | |
| 2013/0086833 | A1 | 4/2013 | Nunez et al. | |
| 2014/0241785 | A1 * | 8/2014 | Burns | B42F 3/04 402/19 |
| 2016/0167424 | A1 | 6/2016 | Busam et al. | |
| 2017/0148361 | A1 | 5/2017 | Eversole et al. | |
| 2019/0092553 | A1 * | 3/2019 | Michaels | B65D 65/10 |
| 2019/0357494 | A1 | 11/2019 | Garrett et al. | |

FOREIGN PATENT DOCUMENTS

| | | | | |
|---|---|---|---|---|
| GB | 2249755 | * | 5/1992 | B42F 13/0006 |
| GB | 2249755 | A1 * | 5/1992 | B42F 13/0006 |
| JP | 2020001820 | A | 1/2020 | |
| KR | 20170003623 | U * | 10/2017 | B42F 13/16 |
| SE | 530349 | C2 * | 5/2008 | B42F 13/42 |
| WO | 9705556 | | 2/1997 | |
| WO | 2008085121 | | 7/2008 | |

OTHER PUBLICATIONS

Kissel, "Vestcom Helps Retails Court Shoppers," Associated Press Online (Mar. 28, 2006).

"Vestcom Retail Solutions Group to Provide Point-of-Purchase Merchandising Solutions to Food Lion & Kash 'n Karry Supermarkets," PR Newswire (Feb. 10, 2000).

"Xerox Extends Media Offerings," Business Wire (Feb. 28, 2000).

Bracke, "High Throughput Industrial Digital Printing," NIP17: International Conference on Digital Printing Technologies, pp. 28-32 (Sep. 2000).

Chatow and Samuel, "Digital Labels Printing," NIP19: International Conference on Digital Printing Technologies, pp. 476-481 (Sep. 2003).

Vestcom website accessible to the public at least as early as Mar. 14, 2006, through http://web.archive.org/web20060314071113/http://www.vestcom.com/retail/pops 01_adtags.shtml.

* cited by examiner

BINDER BOX

CROSS REFERENCE TO RELATED APPLICATION

Applicant hereby claims the priority under 35 U.S.C. § 120 to commonly assigned, co-pending U.S. application Ser. No. 16/930,404, filed Jul. 16, 2020, entitled BINDER BOX, which claim the priority benefits under the provisions of 35 U.S.C. § 119, basing said claim of priority on related U.S. Provisional Application No. 62/874,690 filed Jul. 16, 2019, which is incorporated in its entirety herein by reference.

BACKGROUND OF THE INVENTION

The present invention relates to a method of printing, distributing, and placing price information, such as price tags and point-of-purchase signs for use in retail store shelves and displays. For example, it includes aspects relating to price information tags attached to shelves under the products being sold and to other information associated with products for sale. The present method is particularly useful for just-in-time printing and delivery of tags with minimal lead times, and for faster tag changes at stores while reducing labor cost. However, the present invention is contemplated to be broader in scope than just printing and distributing of price information tags.

Consumers (as well as consumer protection laws) require accurate information about products being displayed on store shelves. Price information (such as a price change) placed on a shelf "too soon" or "too late" causes considerable consumer dissatisfaction (e.g., out-of-stocks or "mis-stocks") and/or causes significant in-store confusion or delays (e.g., price checks), as well as concern from regulatory agencies. However, getting tags onto shelves is a surprisingly complex and difficult task for a number of reasons. For example, buyers may be negotiating on supplier prices right up to the last possible minute, such that prices and even product availability may be uncertain until the "last possible minute." Product availability and delivery concerns may also cause uncertainty right up to the last possible minute. Management often wants to make product pricing decisions as close as possible to the "on sale" date so that uncertainties about future product availability and consumer purchasing trends and other price-related strategies can be incorporated into the pricing decisions. Thus, a system is desired allowing retail prices to be set as late as possible to allow optimal (last minute) control over retail pricing.

Aside from timing issues noted above, information management is very difficult. Large stores now carry hundreds of thousands of products, and the logistics of getting timely-printed price information tags in appropriate places on store shelves is a time-consuming, highly-manually-intensive task. An amazing amount of time is spent inefficiently walking from one shelf to another, and from one end of a shelf to another end, as price information tags are attached to shelves under associated product. Further, this often leads to errors, such as tags being put under the wrong product, or tags simply not being put up at all. Further, attachment of the tags must be secure and long-lasting, yet inexpensive and easily engaged. Thus, a system is desired allowing tags to be securely attached, with minimal risk of mis-location, with secure but low-cost attachment systems. Further, it is preferable that a particular tag be able to be attached in multiple ways, given that many stores have different attachment mechanisms on their shelves.

Recent studies show that product sales can potentially be increased if the price information tags have high-quality product pictures on them. However, this adds greatly to the cost and lead times required for printing the price information tags. Specifically, in order for pictures to be placed on tags, the data for the pictures must be combined with price information, arranged for printing, and then printed. This greatly complicates printing of price information tags, since it compounds problems associated with getting accurate price information onto the tags, with getting accurate pictures onto the tags. Also, the quality of the pictures is very important, since poor photographs will potentially result in the consumer implying poor quality to the store and/or to the products being sold.

Thus, it would be advantageous to have an improved system of delivering price tags to stores and to simplify the manner in which the shelf tags are placed on a shelf.

SUMMARY OF THE INVENTION

In one aspect of the present invention, is a binder box assembly for shelf tags, comprising a binder box having a front wall, a back wall, at least one sidewall, a top surface, and a bottom surface. The bottom surface has at least one first binder opening that is in general alignment with at least one second binder opening that is formed in the transition between the bottom surface and the back wall such that a portion of the second binder opening is located on the bottom surface and a portion on the back wall. The binder box assembly includes a plurality of sheets of shelf tags with at least one third binder opening. At least one binder is inserted through the first binder opening and the second binder opening and also through the third binder opening to couple said plurality of sheets of shelf tags to said binder box.

In another aspect of the present invention is a binder box with a back wall, at least one sidewall, a top surface, and a bottom surface. The binder box has at least one first binder opening in the bottom surface and at least one second binder opening located partly in the bottom surface and partly in the back wall. The binder box has at least one fourth binder opening located in the top surface that will align with the second binder opening when the top surface is rotated over the back wall face. The binder box also has at least one fifth binder opening located in the top surface that will overlap the first binder opening when the top surface is rotated over the back wall and placed adjacent to at least a portion of the bottom surface.

In still another aspect of the present invention is a method of coupling shelf tags to a binder box. The binder box has a front wall, a back wall, at least one sidewall, a top surface, and a bottom surface. The binder box has at least one first binder opening in the bottom surface and at least one second binder opening located partly in the bottom surface and partly in the back wall. The method includes printing a plurality of shelf tags on a plurality of sheets, the sheets having at least one third binder opening. The plurality of sheets are positioned inside the binder box such that the third binder opening generally overlaps with the first binder opening in the binder box. A first end of a binder in inserted through the generally overlapping third binder opening and first binder opening. A second end of the binder in inserted through the second binder opening in the binder box to couple the plurality of sheets to the binder box.

These and other advantages of the invention will be further understood and appreciated by those skilled in the art by reference to the following written specification, claims, and appended drawings.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in the attached drawings. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
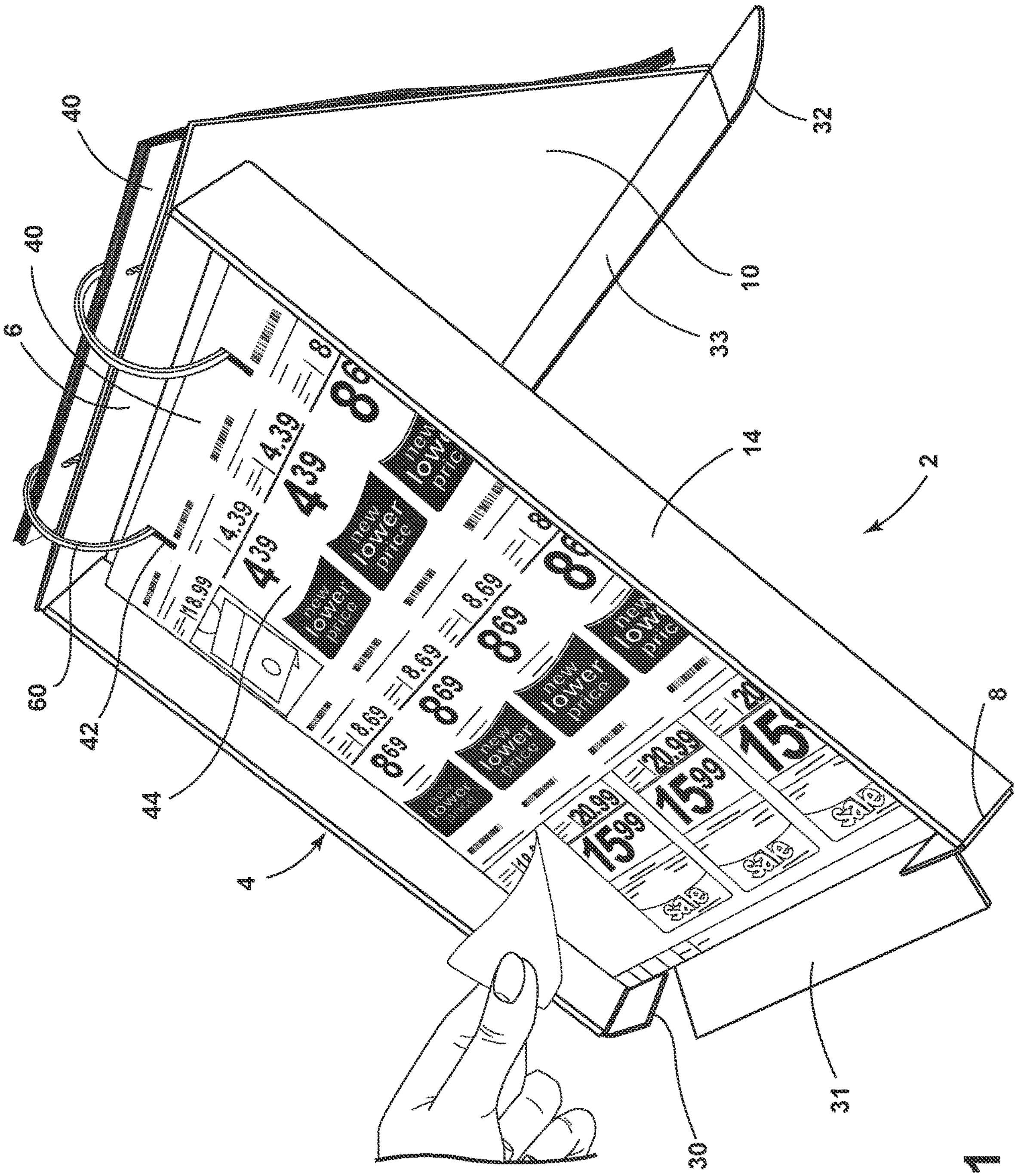
FIG. 1 is perspective view of a binder box assembly embodying one aspect of the present invention.

An exemplary embodiment of the binder box assembly 2 embodying an aspect of the present invention is shown in FIG. 1. The binder box assembly 2 includes a binder box 4, a number of sheets 40 with shelf tags 44, and one or more binders 60 which couple the sheets 40 to the binder box 4.

Figure 2:
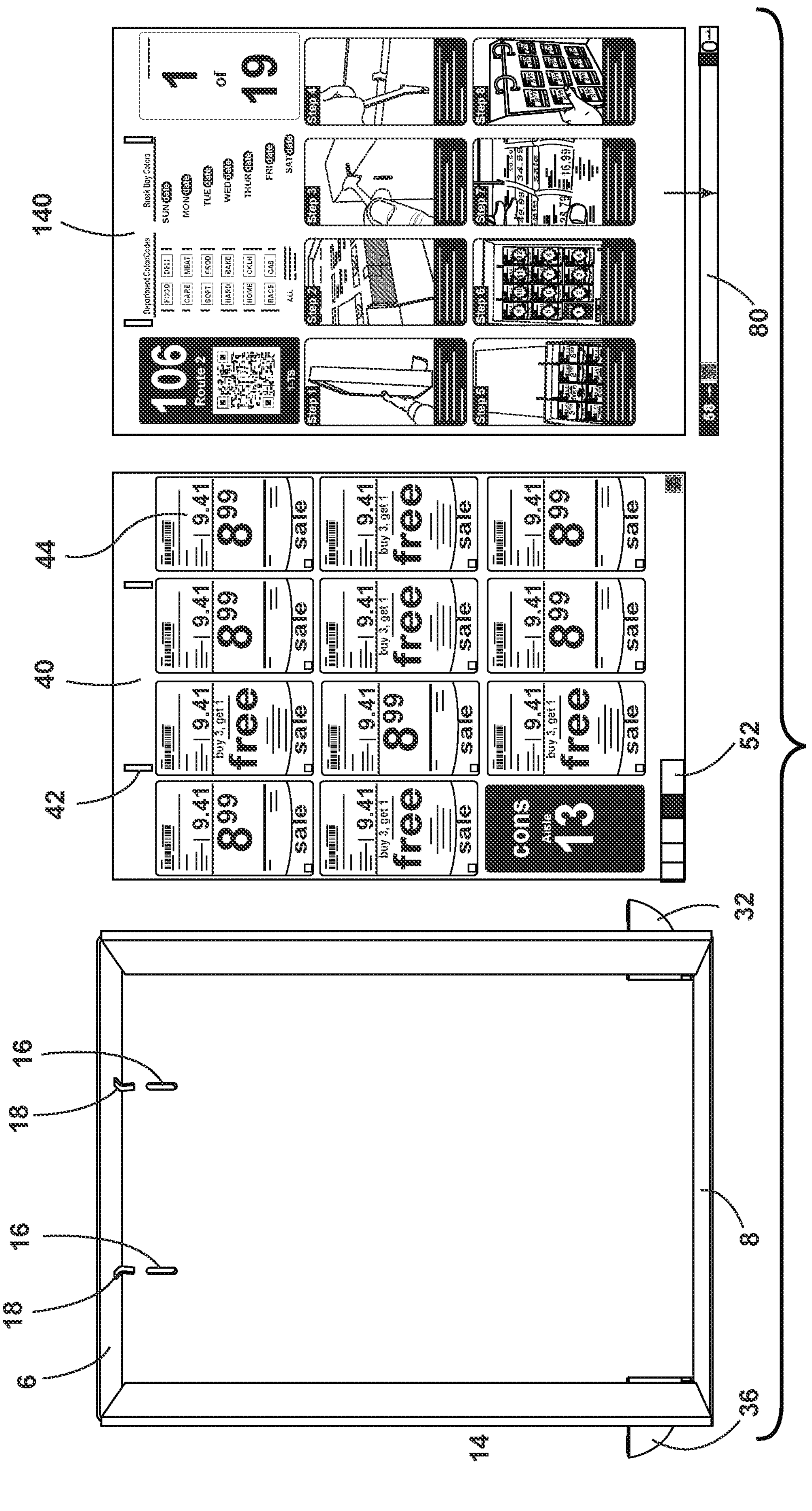
FIG. 2 is top view of the binder box shown in FIG. 1, with the top surface rotated and two sheets.
Figure 14:
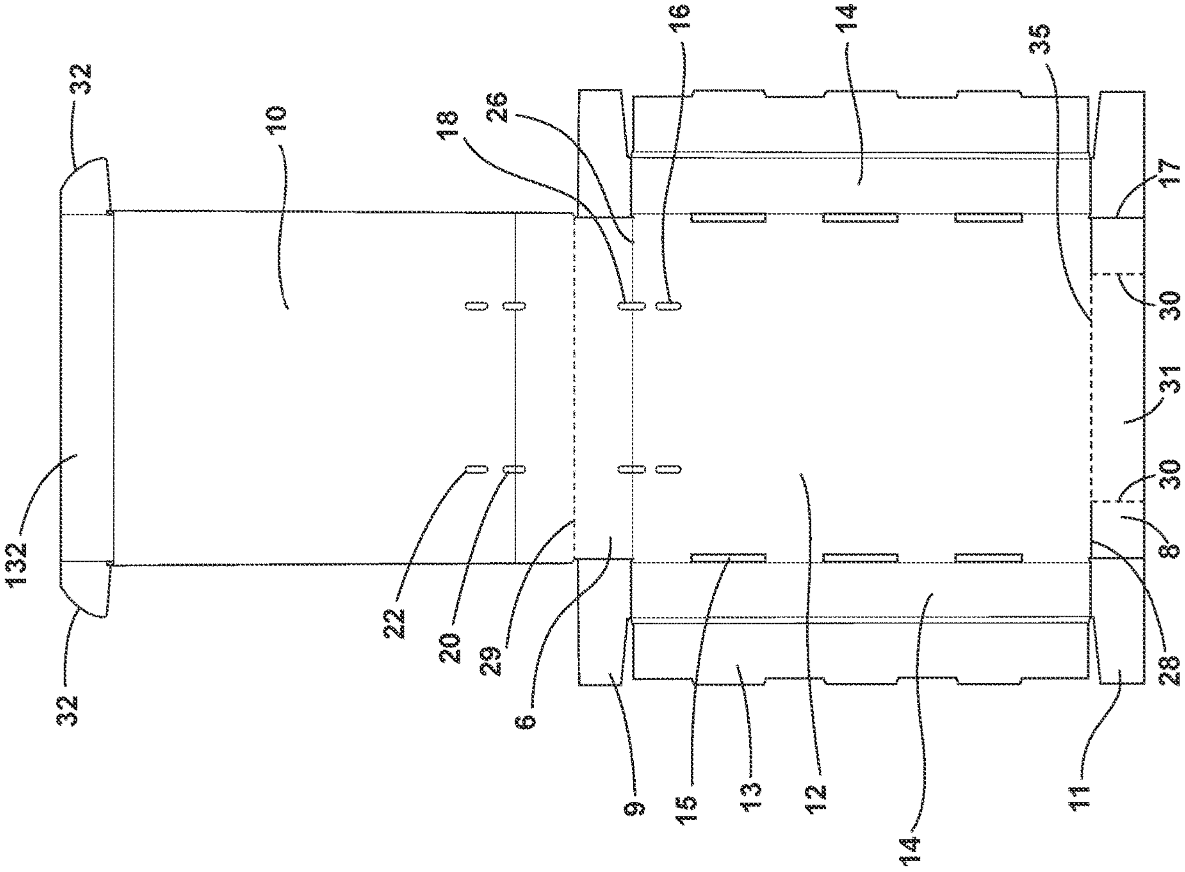
FIG. 14 is top perspective view of the binder box of FIG. 1 unassembled.
Figure 18:
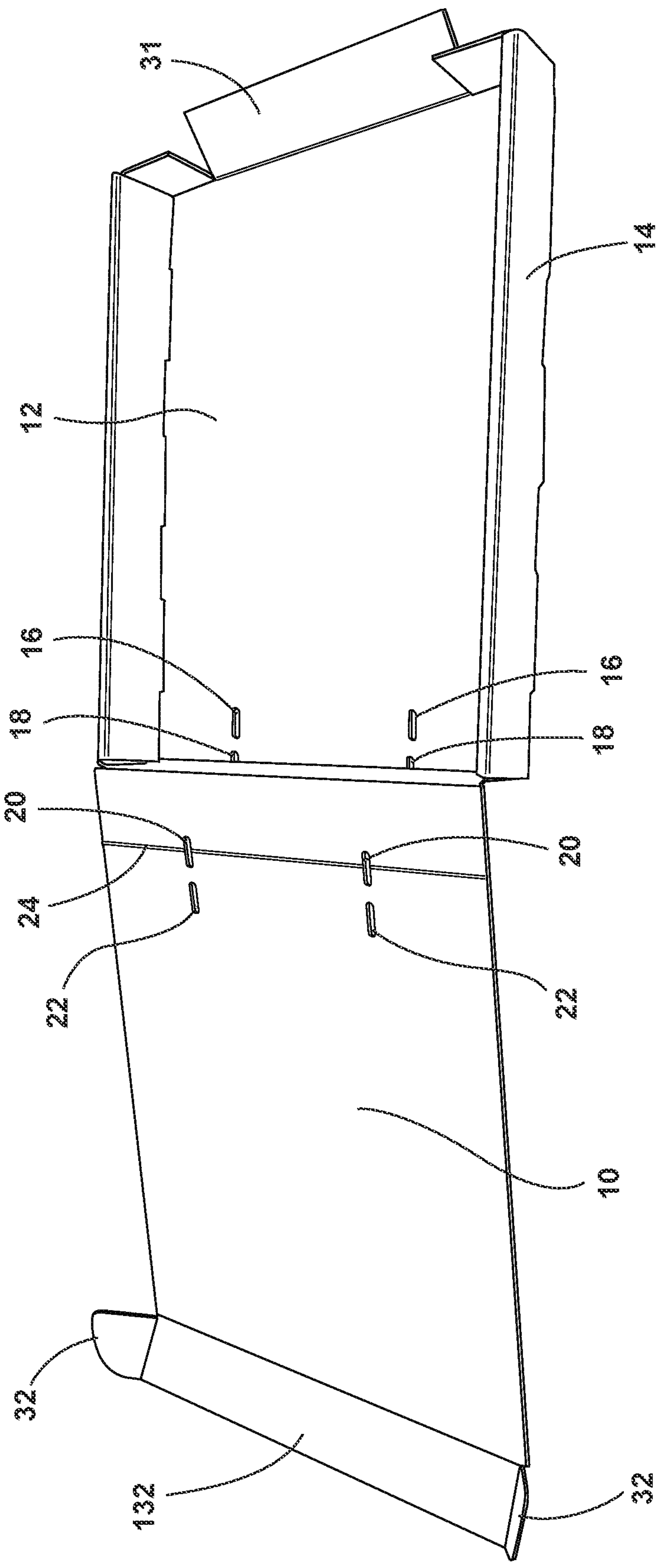
FIG. 18 is a side perspective view of the binder box of FIG. 17 in an open position.
Figure 19:
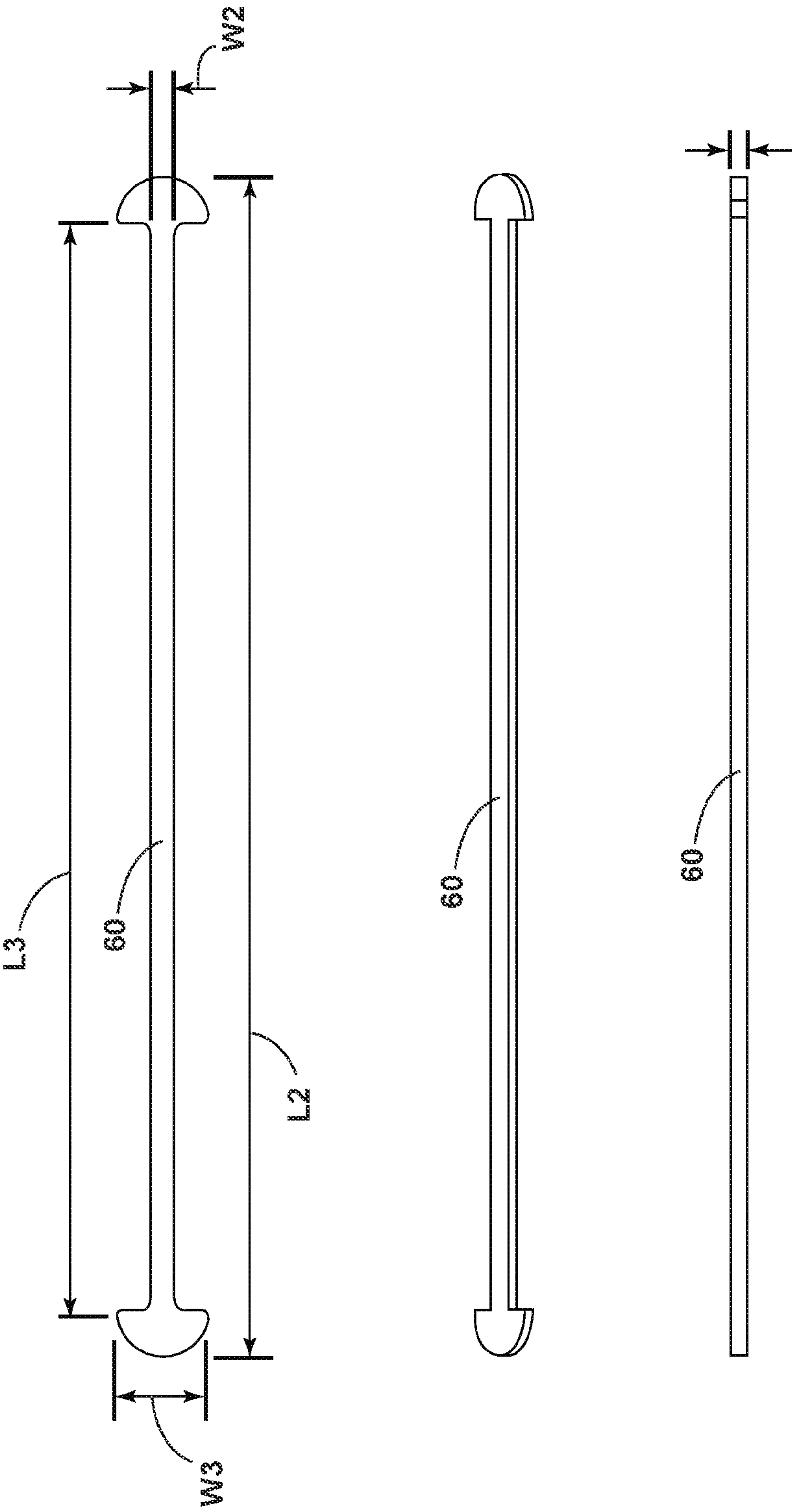
FIG. 19 is a top view, side perspective view, and a side view of a binder.

As illustrated in FIGS. 1, 2, 14-18, and 20, the binder box 4 has a back wall 6, a front wall 8, a top surface 10, a bottom surface 12, and two sidewalls 14. The binder box 4 has a number of aligned binder openings to receive binders 60. In the illustrated embodiment, the binder box assembly 2 utilizes two binders 60, thus, there are two sets of aligned openings for the binders 60. The binder box 4 has first binder openings 16 located on the bottom surface 12 as best illustrated in FIGS. 14 and 18. As illustrated in FIG. 2, second binder openings 18 are located at the transition 26 between the bottom surface 12 and the back wall 6 such that a part of the second binder opening 18 is located in the bottom surface 12 and a part of the second binder opening 18 is located in the back wall 6. In the illustrated embodiments, approximately half of the second binder opening 18 is located on the bottom surface 12 and half in the back wall 6. However, the second binder opening 18 can positioned such that the bottom surface 12 has more or less than half of the second binder opening 18.

The top surface 10 has fourth binder openings 20 and fifth binder openings 22. When the top surface 10 is rotated over the back wall 6 and bottom surface 12, as shown in FIG. 2, the fourth binder openings 20 of the top surface 10 will generally overlap with the second binder openings 18 and the fifth binder openings 22 will overlap with the first binder openings 16. In this arrangement, the binder 60 can be inserted through the sets of aligned and overlapping binder openings in the binder box 4 and the sheets 40 as to permit the binder box 4 to be easily carried.

The top surface 10 can alternatively be entirely removed by tearing the top surface 10 at the perforated transition 29 between the back wall 6 and the top surface 10. In such an arrangement, the binder 60 can be inserted into the first binder opening 16 and the second binder opening 18 and coupled to the sheets 40 to the binder box 4 as described below.

Figure 15:
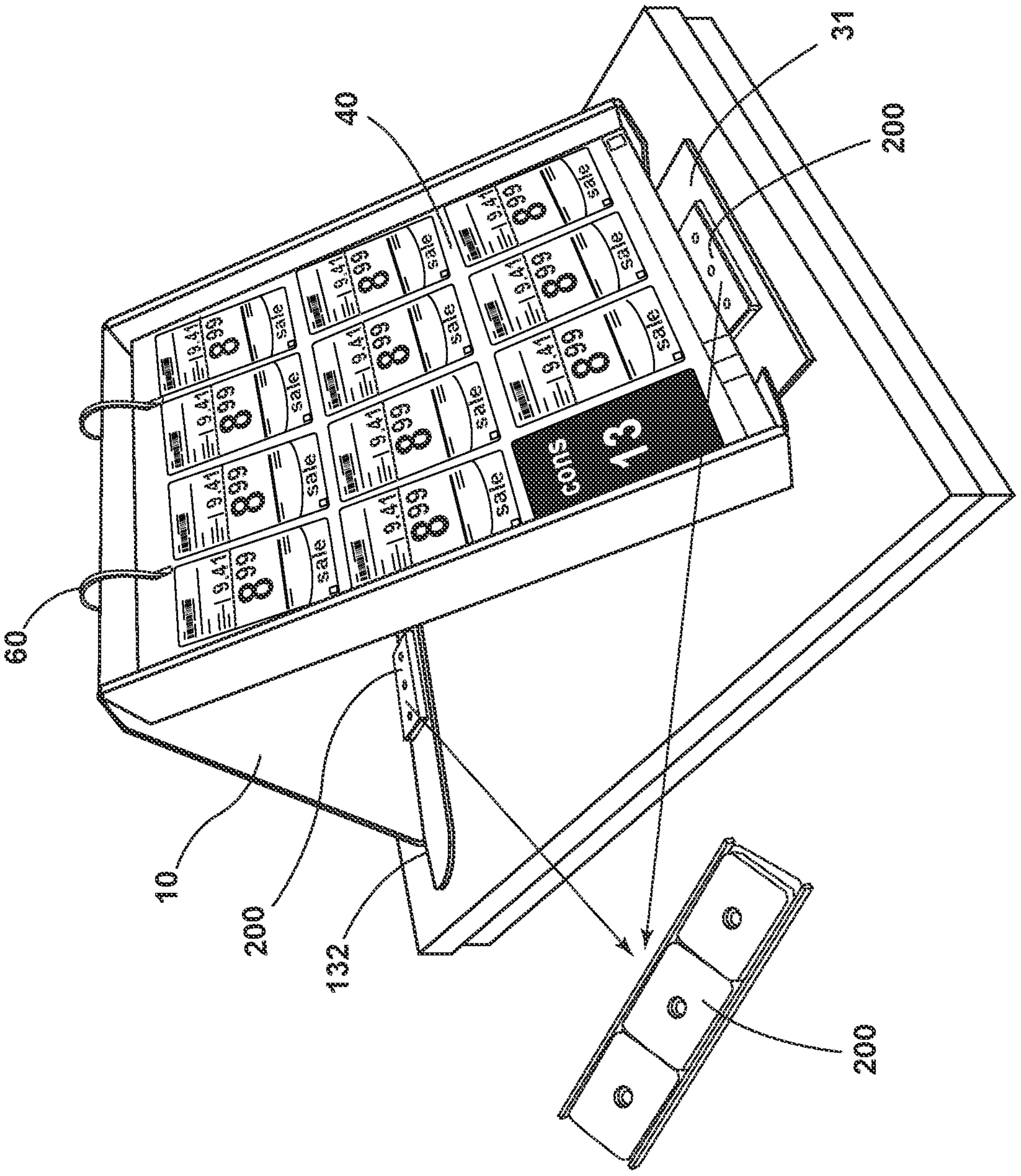
FIG. 15 is a front perspective view of a binder box assembly utilizing magnets to stand the binder box assembly in a raised position.
Figure 16:
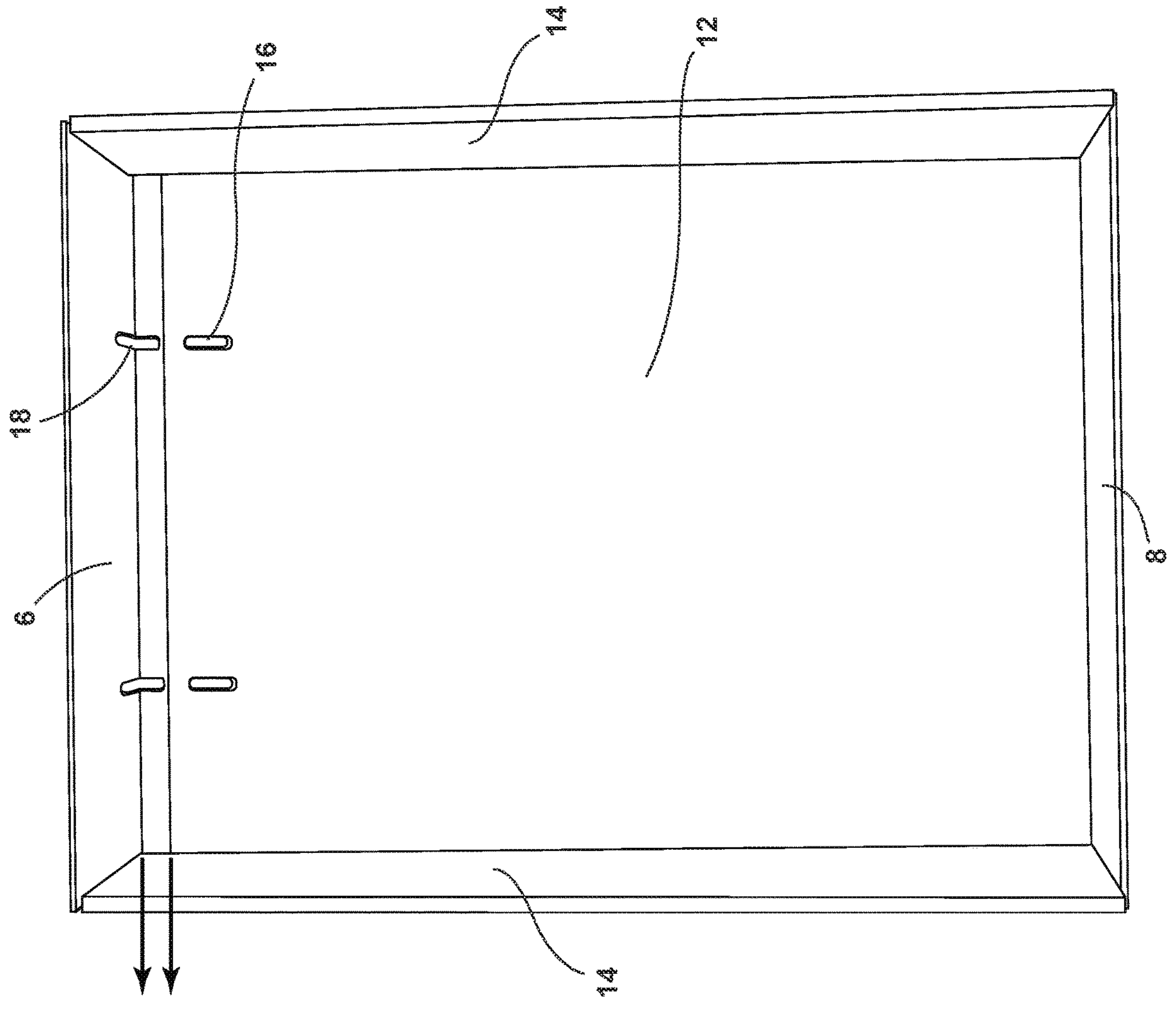
FIG. 16 is a top perspective view of the binder box of FIG. 1 with the top surface removed.
Figure 17:
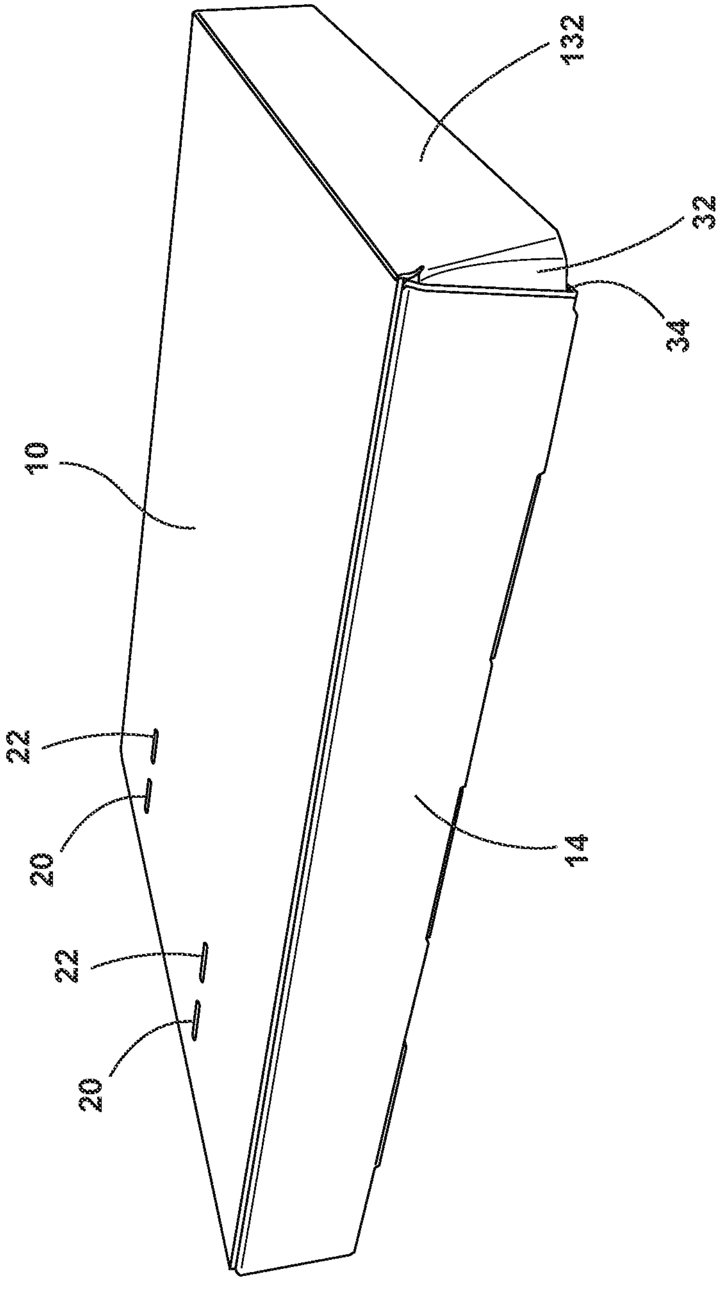
FIG. 17 is a side perspective view of the binder box shown in FIG. 1 with the top surface in a partially closed position.
Figure 20:
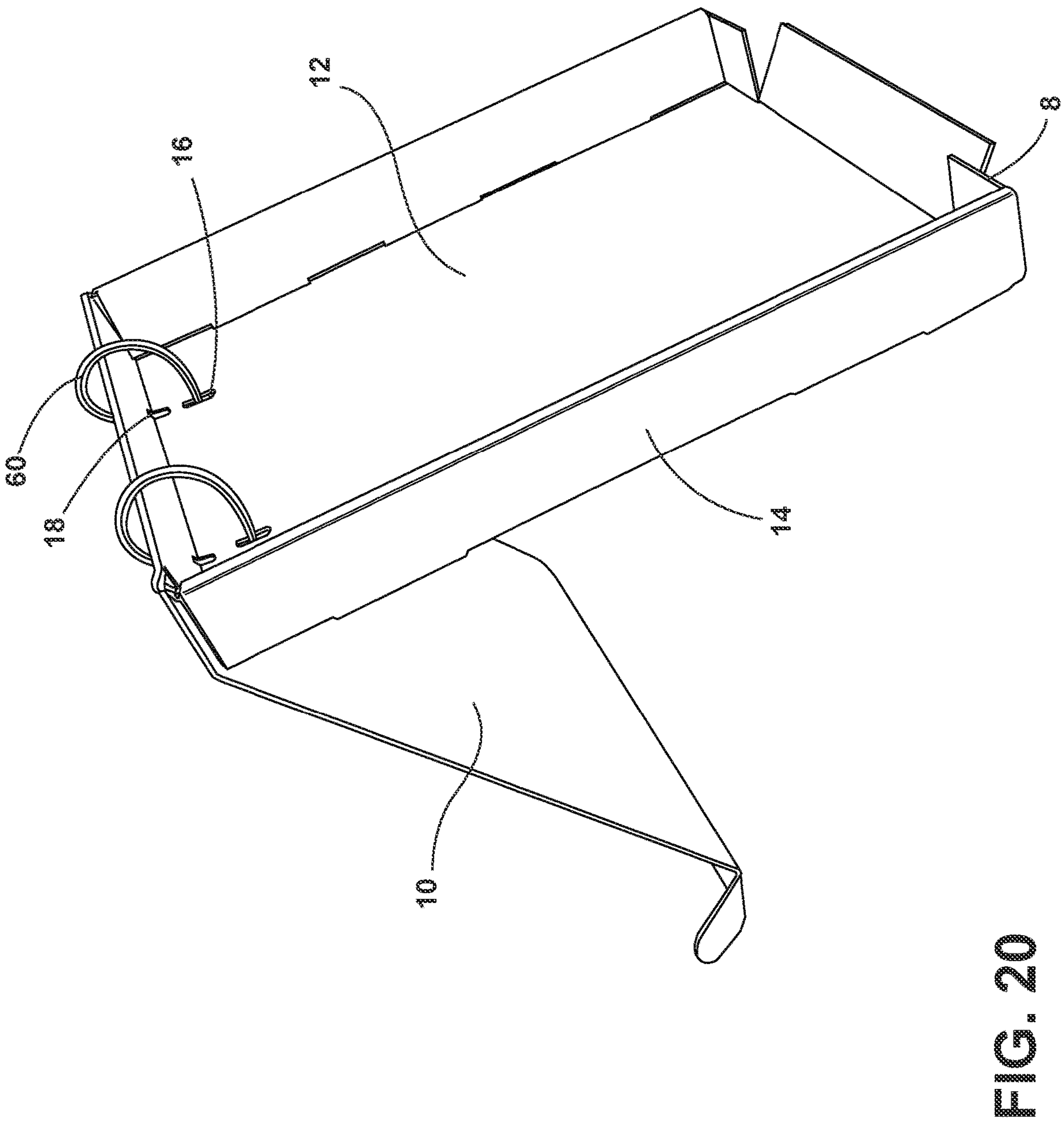
FIG. 20 is side perspective view of the binder box assembly of FIG. 1 without any sheets.

The top surface 10 can also be rotated to position the binder box 4 in an angled manner as shown in FIGS. 1, 15, and 20. In such an arrangement, the fifth binder opening 22 will not overlap the first binder opening 16 and the binder 60 will not be inserted through the fifth binder opening 22. The binder 60 may or may not be inserted through the fourth binder opening 20 in this arrangement. As illustrated in FIG. 15, the binder box assembly 2 may be held in an angled position on a magnetic surface through the use of magnets 200 that cover flaps 31 and 132 of binder box 4.

As illustrated in FIG. 14, the binder box 4 can be made from a single piece of material. The material can be any material that can be punched and perforated. For example, paperboard, cardboard, other cellulose material, polymeric materials, and coated materials can be used. The material can also include multiple layers of material and/or include recycled and/or post-consumer material. Moreover, the material can be biodegradable. The material can also include a generally flat surface and/or a textured surface. In the illustrated examples, the binder box 4 is made from a cardboard material that can be a single or multiple walled corrugated cardboard. The binder box 4 can be made by stamping, cutting, punching, molding or otherwise forming the material from one or more pieces of the same or different materials.

The binder box 4 illustrated in FIG. 14 is made by having tabs 13 on sidewalls 14 folded into openings 15 in the bottom surface 12. When this is done, a pocket 34 (FIG. 17) is formed on the front end of each sidewall 14. The front wall 8 has tabs 11 that can be received in the pockets 34 of the sidewalls 14. The front wall 8 also has perforations 30 that permit a flap 31 to be opened in the front wall as the flap 31 is bent towards the bottom surface 12 as sown in FIGS. 18 and 20. The flap 31 can be entirely removed if torn along the perforated section 35 in the transition 28 between the front wall 8 and the bottom surface 12. The back wall 6 can include tabs 9 that are received in a rearward pocket in sidewalls 14. The top surface 10 include a flap 132 and tabs 32. When the binder box 4 is in a closed position (FIG. 17), the tabs 32 on the top surface 10 will also be received in pockets 34 in the sidewalls 14. This permits the binder box 4 to be shipped or delivered with the sheets 40 of shelf tags 44 enclosed within the binder box 4. Once at the store, the binder box 4 can be opened, the binders 60 installed, and the shelf tags 44 removed from the sheets 40 and installed on shelves. The binder box 4 illustrated in FIG. 14 has a flat dimension of approximately 16.1726 inches wide by 29.2751 inches tall, with the binder openings 16, 18, 20, 22 being approximately 0.16 inches by 0.6 inches-0.7 inches. The second binder openings 18 and the fifth binder openings 22 may be slightly smaller than the first binder openings 16 and the fourth binder openings 20. For example, the second binder openings 18 and the fifth binder openings 22 may have a length of 0.6 inches while the first binder openings 16 and the fourth binder openings 20 have a length of 0.675 inches.

The sheets 40 can include a plurality of shelf tags 44 that are adhered to each sheet 40. The sheets 40 also have third binder openings 42 that will align over the first binder openings 16 in the bottom surface 12 of the binder box 4 when the sheets 40 are installed in the binder box 4. In the illustrated embodiment the sheets 40 have a pair of third binder openings 42 that are located at the upper portion of the sheet 40 and are positioned in between shelf tags 44. The third binder openings 42 are also generally offset by the same approximate distance from the vertical centerline of the sheet 40. For example, in the illustrated embodiment, each sheet 40 has three rows of four shelf tags. The third binder openings 42 are positioned between the upper ends of the first and second tags 44, and the upper ends of the third and fourth tags 44 in the first row as shown in FIG. 15. When the sheets 40 are placed in the binder box 4, there should be a gap A between the top of the sheets 40 and the transition 26 between the back wall 6 and the bottom surface 12 of the binder box 4. In the illustrated embodiment, the gap A can be approximately 0.375 inches.

Figure 12:
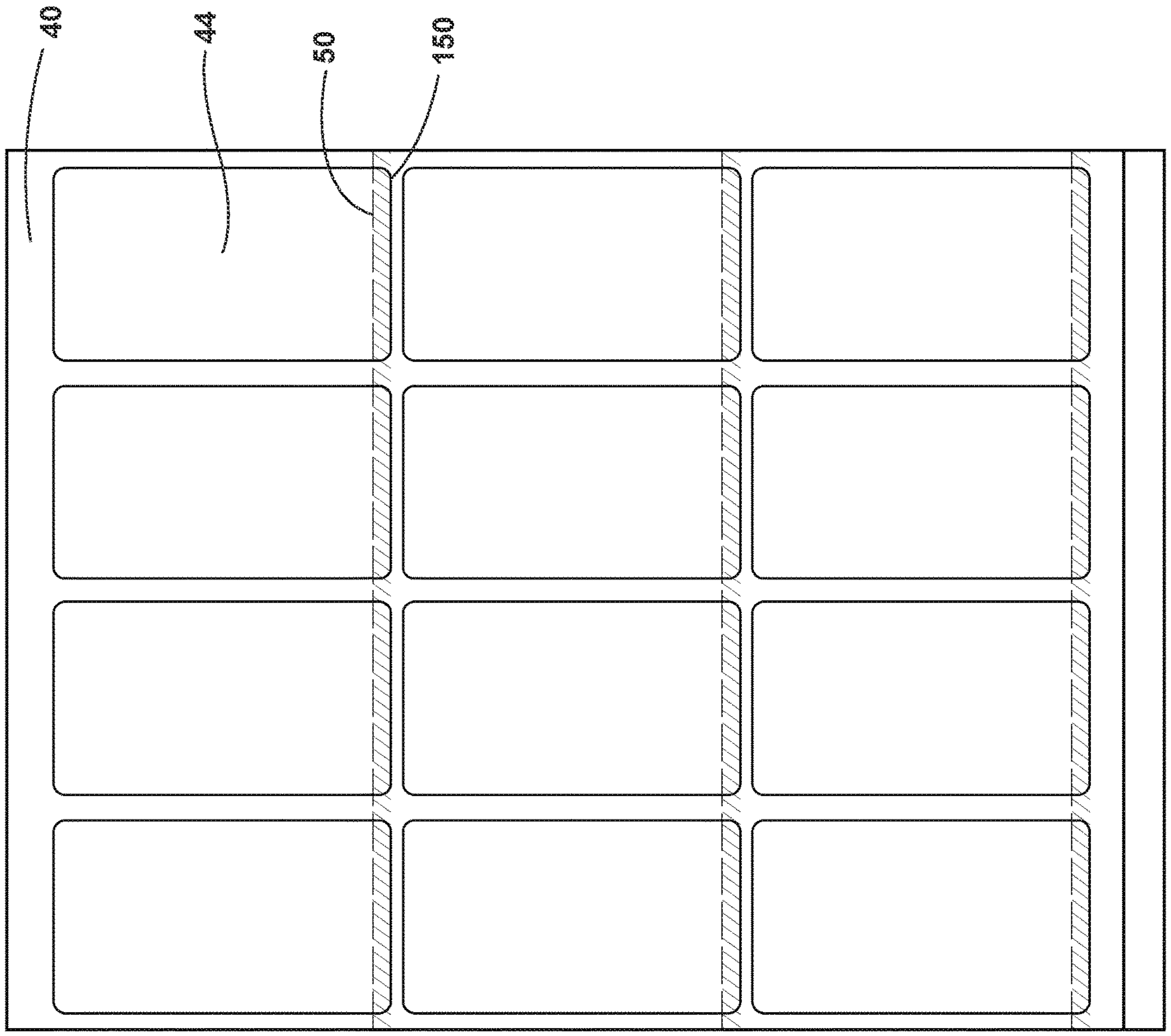
FIG. 12 is a top view of a sheet with perforations permitting the bottom portion of each shelf tag to be separated from the sheet when the sheet is bent at the perforations.
Figure 13:
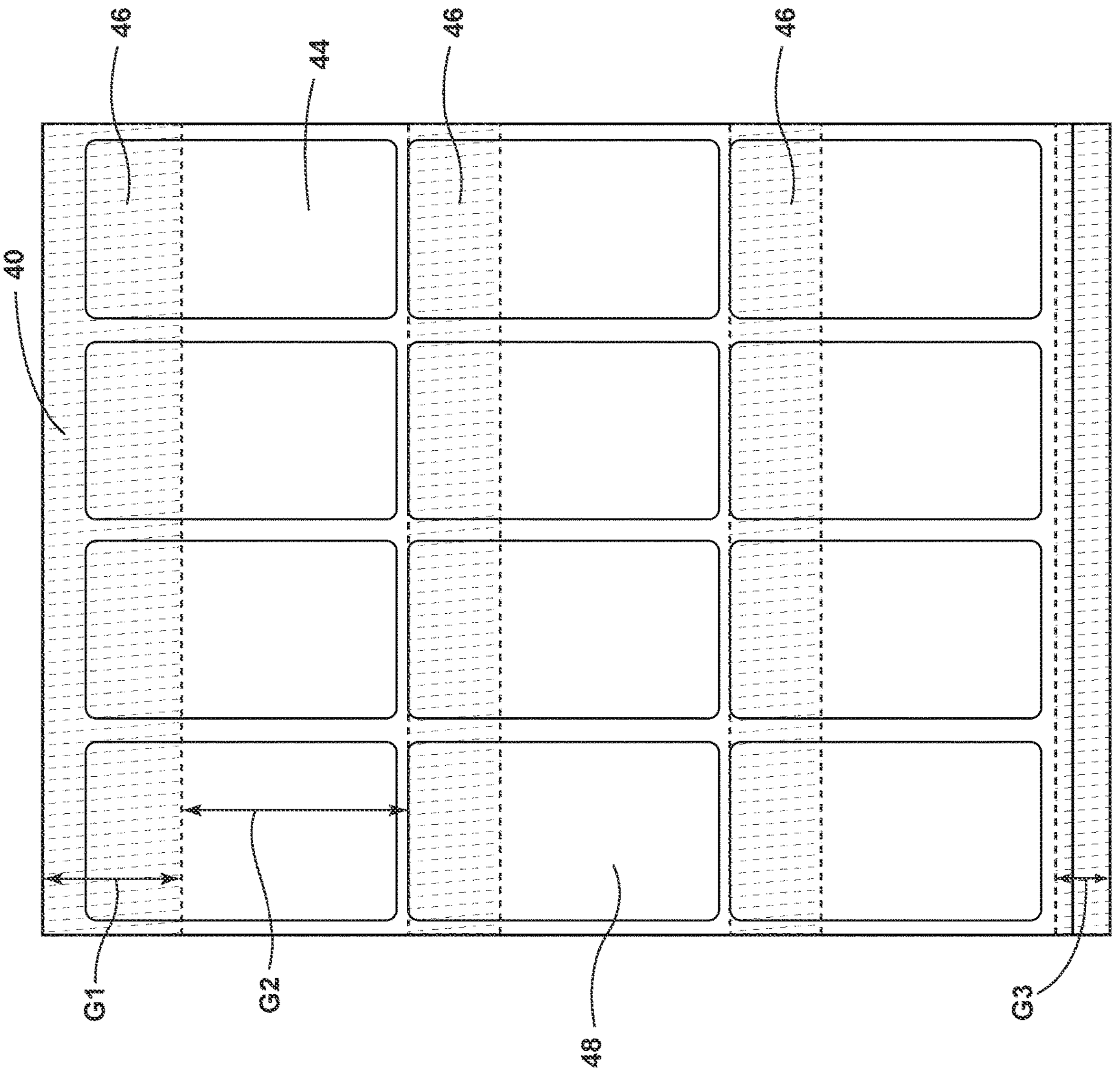
FIG. 13 is a top view of a sheet with adhesive being used on only a portion of the shelf tags.

The shelf tags 44 can be attached to the sheets 40 in a variety of ways. For example, the shelf tags 44 can include adhesive on all of the shelf tags 44 (FIG. 12) or a part of the shelf tags 44 (FIG. 13). In addition, the sheets 40 can include perforations 50 that permit the sheet 40 to be bent to lift a portion 150 of the shelf tags 44 away from the sheet 40. Instead of perforations 50, the sheets 40 could include a pre-bent section. When a portion of the shelf tag 44 dos not include active adhesive, the height G1 of the first glue section (FIG. 13) can be approximately 1 inch-2 inches and more preferably approximately 1.472 inches at the top of the 9 inches wide by 12 inches tall sheet 40. Each shelf tag 44 is approximately 2 inches by 2.5 inches. The distance G2 between the first glue section G1 and the second glue section is between 1.5 inches and 2 inches and more preferably approximately 1.72 inches. The remaining glue strip heights for the other three rows is approximately 1 inches to 1.25 inches and more preferably approximately 1.03 inches. The bottom glue strip G3 has a height of between 0.05 inches and 1 inches and more preferably approximately 0.625 inches. The portions of the shelf tags 44 that do not have active adhesive may have deadened sections 48 of adhesive or no adhesive whatsoever. While the illustrated example is a 9×12 inch sheet 40 with 12 shelf tags 44, any number of shelf tags 44 can be included on a 9×12 inch sheet 40, and/or the sheet 40 can be a different size. If the number of shelf tags 44 and/or the size of the sheet 40 is altered, the measurements of spacing and glue sections may be altered as well. In addition, the shelf tags 44 can be attached to and/or released from the sheet 40 in any other manner.

Figure 11:
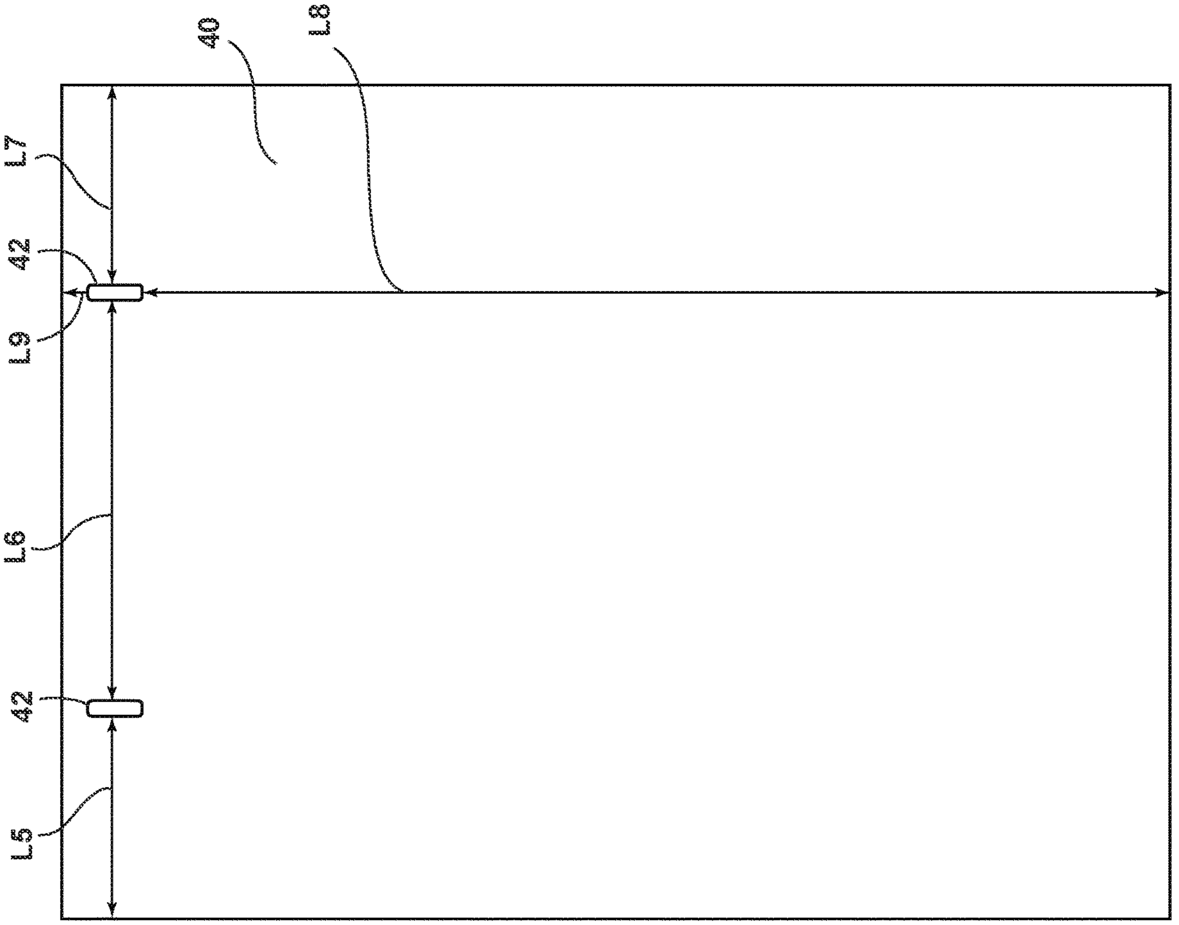
FIG. 11 is a top view of a sheet showing the dimensions of various aspects of the sheet.

The 9×12 inch sheet 40 can have third binder openings 42 that are approximately 0.016 inches by 0.6 inches with a 0.04 inches corner radius. An exemplary spacing of the third binder openings 42 on sheets 40 is illustrated in FIG. 11 with L5 and L7 being approximately 2.17 inches, L6 being approximately 4.34 inches, L9 being approximately 0.278 inches, and L8 being approximately 11.122 inches. Again, this is simply an exemplary embodiment of the sheet 40 that can vary based upon size of the sheet and the number and/or spacing of the third binder openings 42.

Figure 6:
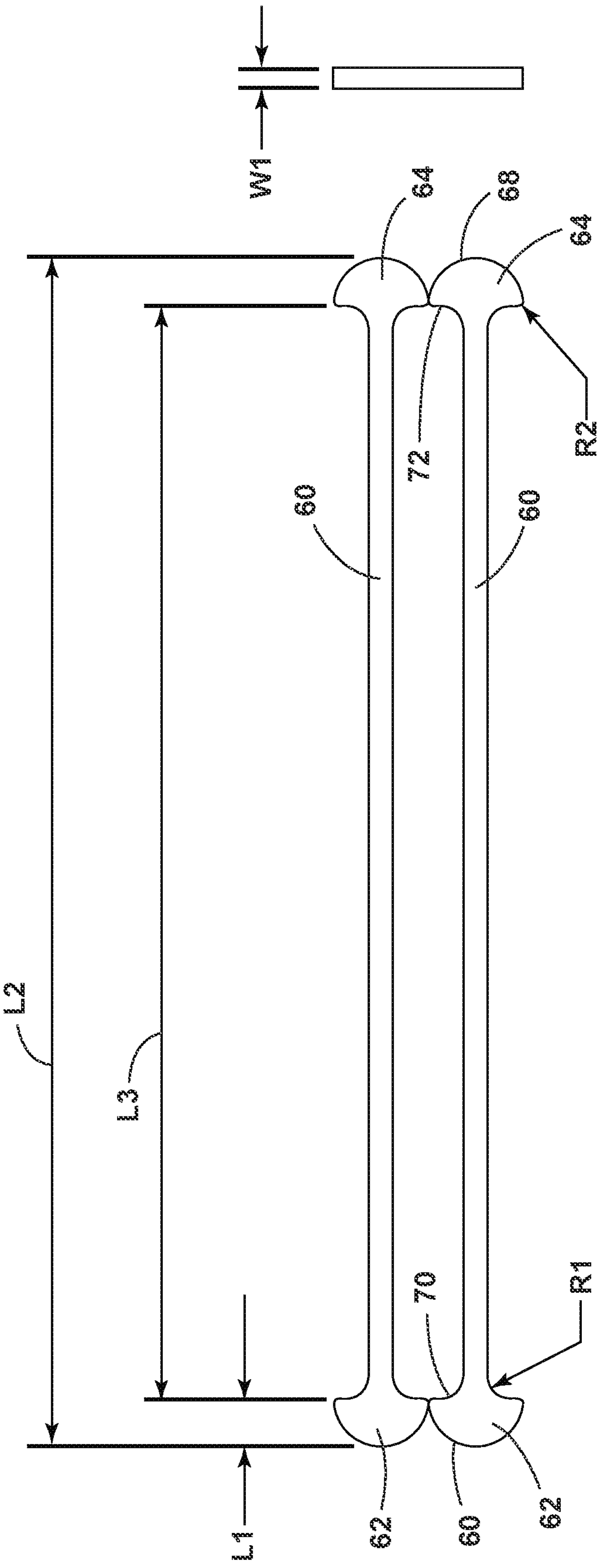
FIG. 6 is a top and side view of a pair of binders.
Figure 7:
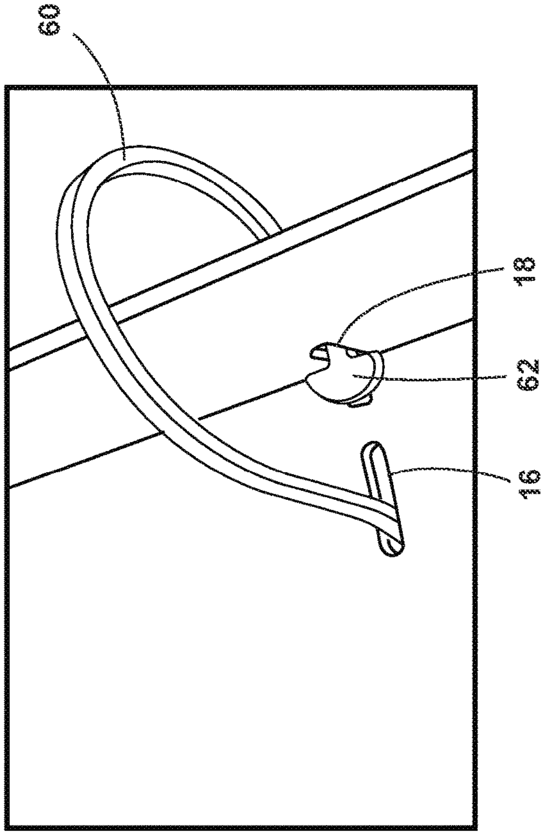
FIG. 7 is top perspective view of the attachment of a binder to a portion of the binder box shown in FIG. 1.
Figure 8:
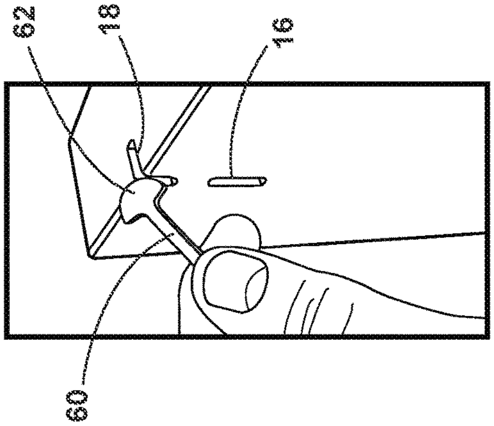
FIG. 8 is a side perspective view of one end of the binder before insertion into the binder box as shown in FIG. 7.
Figure 9:
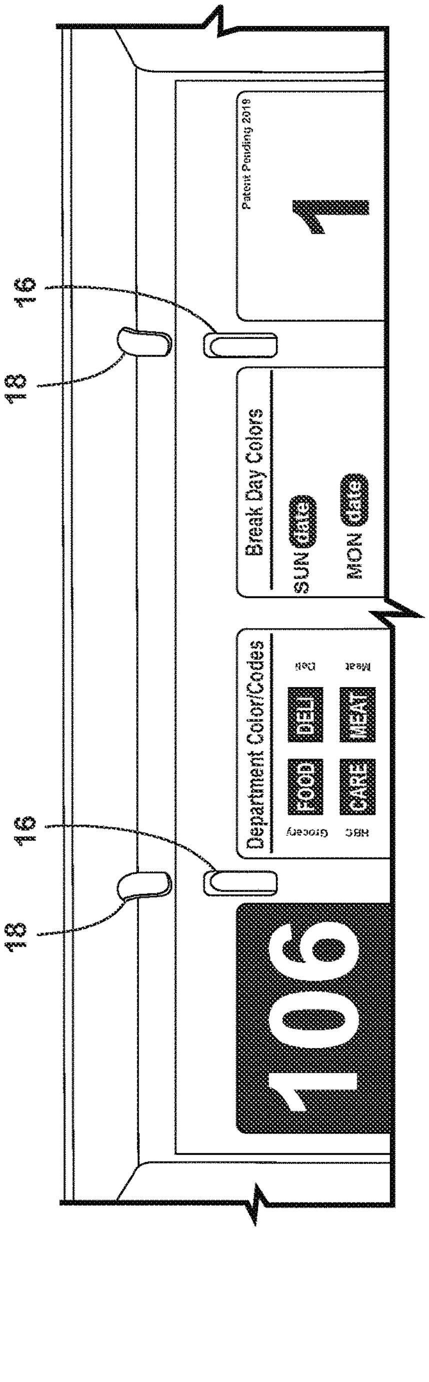
FIG. 9 is a partial top perspective view of a sheet aligned with the binder openings in a binder box.
Figure 10:
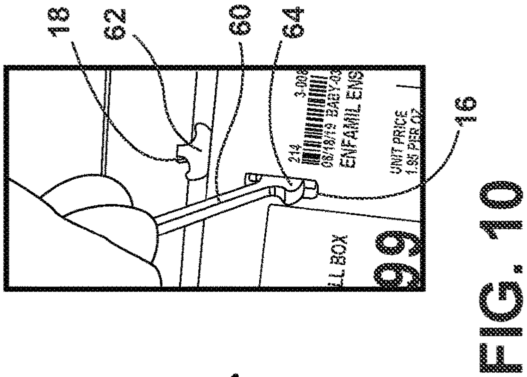
FIG. 10 is a partial top perspective view of the binder being inserted through the binder opening in a sheet.

The binder 60 has a first end 62 with a rounded end 66 and a second end 64 with a rounded end 68. The first end 62 included shoulders 70 and the second end 64 includes shoulders 72 that will engage surfaces on the binder box 4. The rounded ends 66, 68 permit the binder 60 to be easily inserted into the associated binder openings (16, 18, 20, 22, and/or 42) before being rotated to have the shoulders (70, 72) engage surfaces on the binder box 4. As illustrated in FIG. 6, the binder 60 can have an overall length L2 of approximately 6.25 inches and the spacing L3 between the ends (62, 64) can be approximately 5.75 inches. Each end (62, 64) can have a length L1 of approximately 0.25 inches with a radius R1 of approximately 0.118 inches and a radius R2 of approximately 0.03 inches. The width W1 of the binder 60 can be approximately 0.10 inches and the width W2 of each end (62, 64) being greater than W1 to create shoulders 70, 72. As shown in FIG. 6, the binders 60 can come as a set that can be separated by the end user. The binder 60 can be made of any flexible material and have any cross-sectional shape to provide a mechanical and/or physical coupling with the binder box 4. In the illustrated example, the binder 60 is made of a polymeric material, and, more specifically, of a low-density polyethylene.

One end (62, 64) of the binder 60 is inserted from the bottom side of the binder box 4 into the second binder opening 18 that may or may not be aligned with the fourth binder opening 20 depending upon the position of the top surface 10. The binder 60 is then turned a quarter turn to lock the end (62, 64) of the binder 60 in place. The other end (62, 64) of the binder 60 is wrapped around the back wall 6 of the binder box 4 and inserted through the third binder opening 42 in the sheets 40 and through the first binder opening 16 in the binder box 4. That end (62, 64) is rotated a quarter turn to lock it into place. The shoulders 70, 72 on each end of the binder 60 keep the binder 60 engaged to surfaces on the binder box 4. The binder 60 may be inserted into the third binder opening 42 in the sheets 40 and the first binder opening 16 before the binder 60 is inserted into the second binder opening 18.

In this arrangement, the sheets 40 can be flipped once the shelf tags 44 have been used. This is especially important when the tags 44 have been printed in planogram order, thereby permitting easy and quick installation of the shelf tags 44 as the person moves down aisles or within the store.

Figure 3:
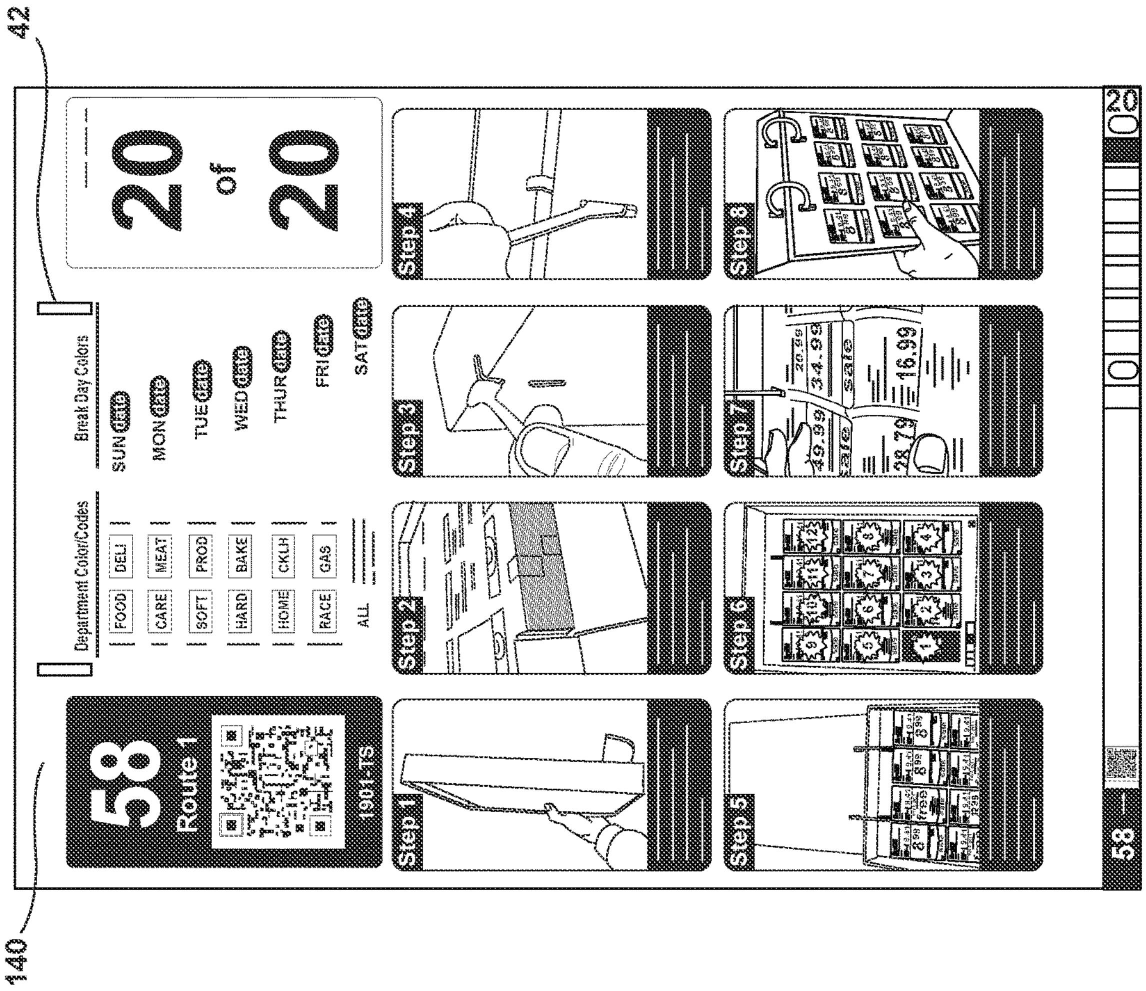
FIG. 3 is a top view of a sheet showing instruction for assembly and use of the binder box assembly.
Figure 4:
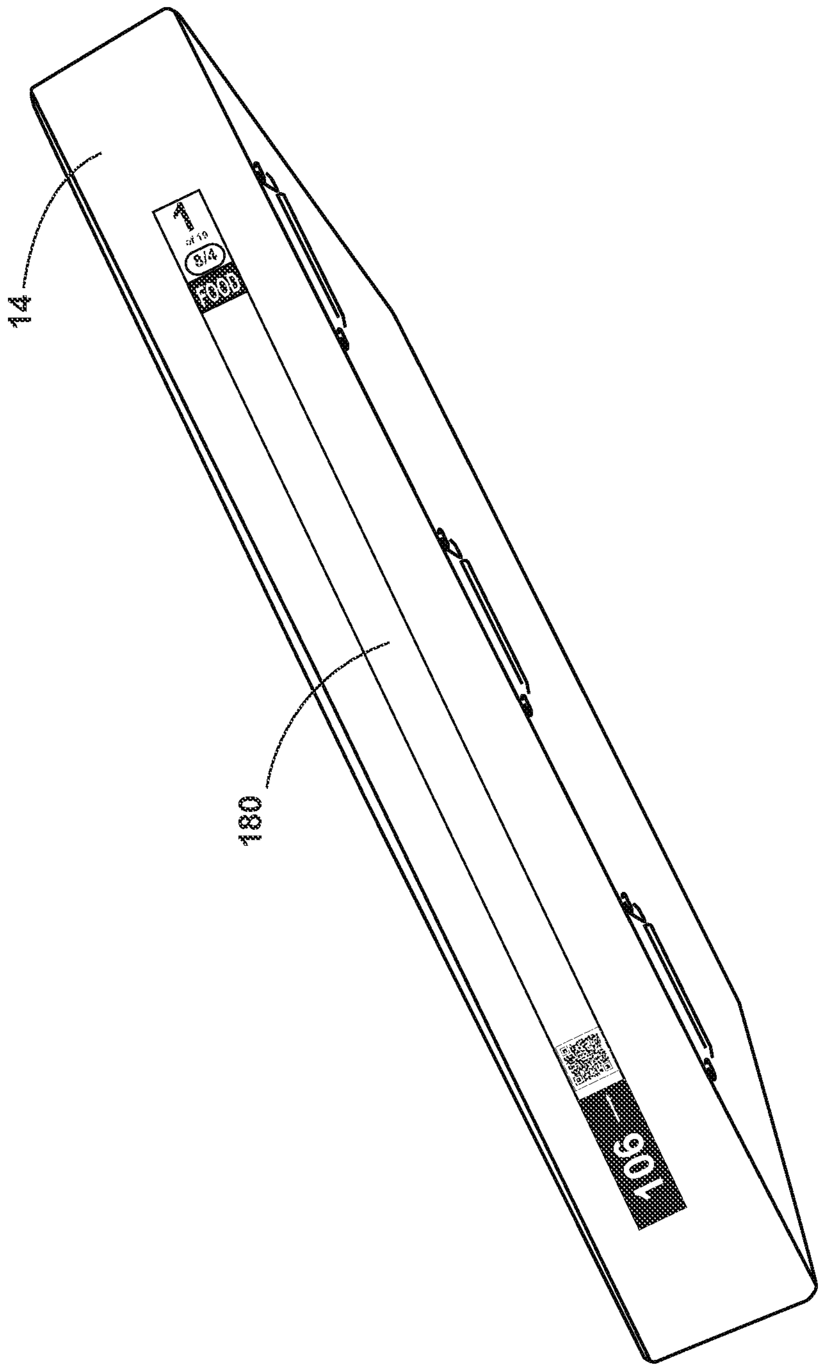
FIG. 4 is a side perspective view of the binder box shown in FIG. 1, in a closed position.
Figure 5:
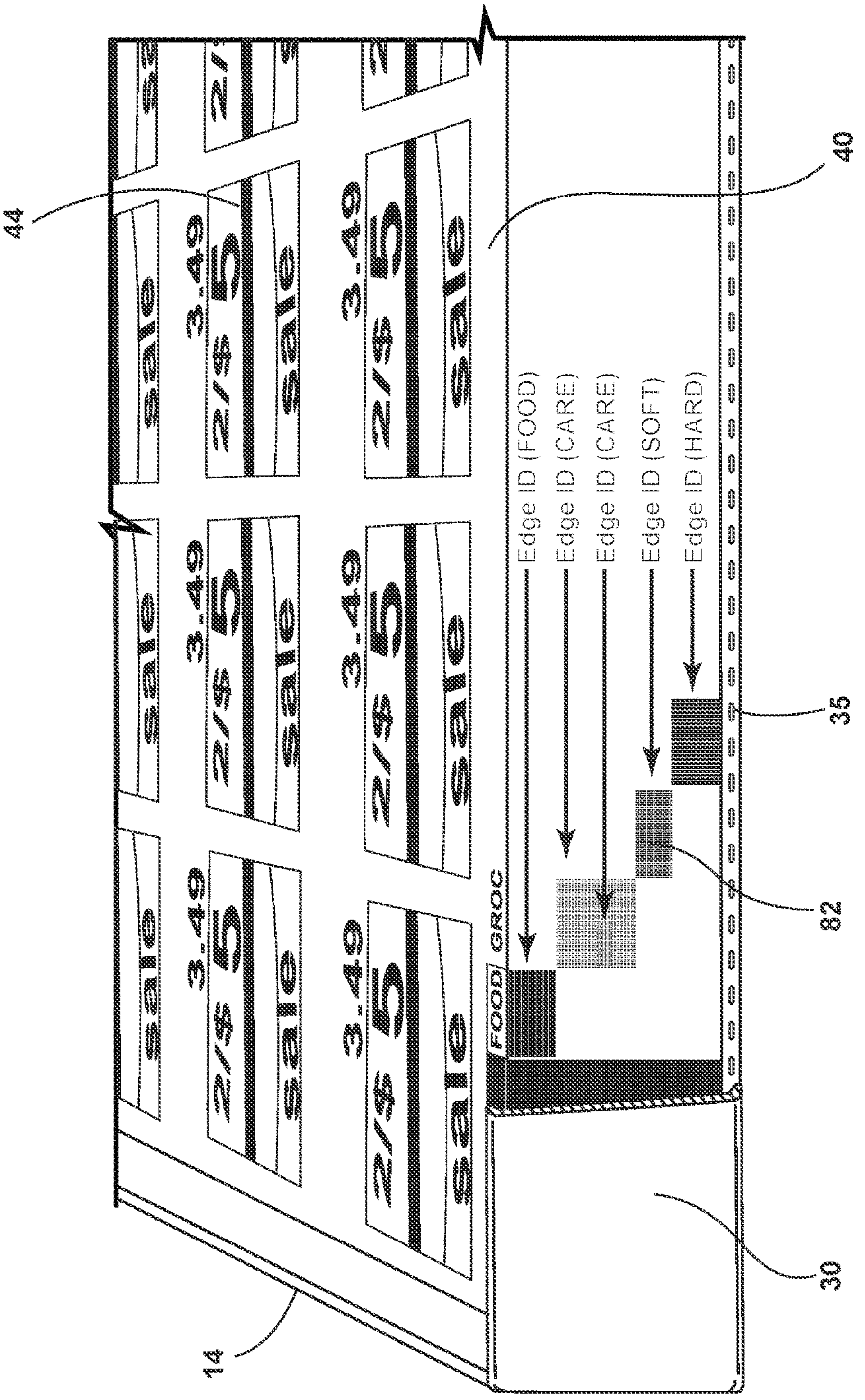
FIG. 5 is a front perspective view of a binder box assembly with edge identification on the sheets of shelf tags.

The flap 31 on binder box 4 that can be opened and/or removed to access the lower ends of the sheets 40. The sheets 40 can have an edge identification 82 (FIG. 5) that permits color coding and/or other organization of the sheets 40 by product, section, or other distinguishing feature for purposes of the store. The binder box 4 can have a label 180 that is on a surface of the binder box 4 to identify the binder box 4 as far as date, store, or other information. As illustrated in FIGS. 2 and 3 one or more of the sheets 40 can contain instructions for assembly and/or use of the binder box assembly 2 and/or can contain labels for attaching to the binder box 4. The shelf tags 44 do not need to be uniform size and can contain various information such as price, stocking status, and any other information.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

In the foregoing description, it will be readily appreciated by those skilled in the art that modifications may be made to the invention without departing from the concepts disclosed herein. For example, without limitation, the size and relative dimensions of the binder box 4, the sheets 40 and the binder 60 can be altered. The number, position, and spacing of the binder openings (16, 18, 20, 22, and/or 42) can also be altered. The perforated sections can include segments of perforations and/or pre-bent surfaces. Such modifications are to be considered as included in the following claims, unless these claims by their language expressly state otherwise.

The invention is claimed as follows:

1. A binder box assembly for shelf tags, comprising:
a binder box having a front wall, a back wall, a pair of sidewalls, a top surface, and a bottom surface, wherein said bottom surface has at least one first binder opening that is in general alignment with at least one second binder opening that is formed in the transition between said bottom surface and said back wall such that a portion of said at least one second binder opening is located on said bottom surface and a portion on said back wall;
wherein said pair of sidewalls includes a pocket located adjacent to said front wall;
wherein said front wall has tabs that are received in said pockets;
wherein said top surface includes tabs that are configured to be received in said pockets in said sidewalls when said binder box is closed;
a plurality of sheets of shelf tags with at least one third binder opening;
at least one binder that is inserted through said at least one first binder opening, said at least one second binder opening, and said at least one third binder opening to couple said plurality of sheets of shelf tags to said binder box;
wherein said binder includes at least one shoulder that engages said second binder opening adjacent to an interior surface of said back wall and an interior surface of said bottom surface; and
wherein said binder includes another shoulder that engages an exterior surface of said bottom surface of said first binder opening.

2. The binder box assembly of claim 1, wherein said top surface includes at least one fourth binder opening and at least one fifth binder opening.

3. The binder box assembly of claim 2, wherein said top surface contains at least one perforated surface to permit said top surface to be rotated to overlap said back wall and at least a portion of said bottom surface, thereby aligning said at least one fourth binder opening over said at least one second binder opening and said at least one fifth binder opening over said at least one first binder opening.

4. The binder box assembly of claim 3, wherein said at least one binder is inserted through said at least one first binder opening, at least one second binder opening, at least one fourth binder opening, and at least one fifth binder opening in said binder box and said at least one third binder opening in said plurality of sheets of shelf tags.

5. The binder box assembly of claim 1, wherein said at least one binder includes a pair of shoulders on each end of said binder.

6. The binder box assembly of claim 5, wherein said binder is a polymeric strap with a pair of shoulders on each end of said polymeric strap.

7. The binder box assembly of claim 1, wherein said binder box is made from cardboard.

8. A binder box, comprising:
a back wall, a pair of sidewalls with pockets, a top surface, and a bottom surface having tabs received in said pockets of said sidewalls, including:
at least one first binder opening in said bottom surface;
at least one second binder opening located partly in said bottom surface and in said back wall;
at least one fourth binder opening located in said top surface that aligns with said at least one second binder opening when said top surface is rotated over said back wall; and
at least one fifth binder opening located in said top surface that overlaps said at least one first binder opening when said top surface is rotated over said back wall adjacent to at least a portion of said bottom surface.

9. The binder box of claim 8, further including a front wall with at least two perforated sections permitting a portion of the front wall to be bent outward.

10. The binder box of claim 8, including a pair of spaced apart first binder openings, a pair of spaced apart second binder openings, a pair of spaced apart fourth binder openings, and a pair of spaced apart fifth binder openings.

11. The binder box of claim 8, wherein said binder box is composed of cardboard.

12. The binder box of claim 8, wherein said top surface includes a section permitting said top surface to rotate over said back wall.

13. The binder box of claim 8, wherein said top surface includes tabs that are received in said pockets in said pair of sidewalls when said binder box is closed.

14. The binder box of claim 8, wherein said binder openings are generally rectangular.

15. A method of coupling sheets of shelf tags to a binder box, comprising:

forming a binder box with a front wall, a back wall, a pair of sidewalls with pockets, a top surface, and a bottom surface having tabs that are positioned within said pockets, including:

at least one first binder opening in said bottom surface; and at least one second binder opening located partly in said bottom surface and in said back wall;

printing a plurality of sheets of shelf tags on a plurality of sheets, said sheets having at least one third binder opening;

positioning said plurality of sheets of shelf tags inside said binder box such that said at least one third binder opening generally overlaps with said at least one first binder opening; and inserting a first end of at least one binder through said generally overlapping at least one third binder opening and said at least one first binder opening to engage an exterior surface of said bottom surface, positioning said at least one binder over said back wall, and inserting a second end of said at least one binder through the exterior surface of said back wall and said at least one second binder opening to engage an interior surface of said back wall to couple said plurality of sheets of shelf tags to said binder box.

16. The method of coupling sheets of shelf tags to a binder box of claim 15, wherein said top surface includes at least one fourth binder opening.

17. The method of coupling sheets of shelf tags to a binder box of claim 16, wherein said top surface contains at least one perforated surface to permit said top surface to be rotated to overlap said back wall, thereby aligning said at least one fourth binder opening over said at least one second binder opening.

18. The method of coupling sheets of shelf tags to a binder box of claim 17, wherein said first end of said binder is inserted through said third binder opening and said first binder opening, and said second end of said binder is inserted through said aligned at least one fourth binder opening and said at least one second binder opening.

19. The method of coupling sheets of shelf tags to a binder box of claim 15, wherein said front wall has at least two perforated sections to permit the front wall to be opened to expose an edge surface of said plurality of sheets.

20. The method of coupling sheets of shelf tags to a binder box of claim 15, wherein the bottom of said shelf tags are color-coded for different types of shelf items.

* * * * *